Patented Aug. 19, 1952

2,607,692

UNITED STATES PATENT OFFICE 2,607,692

PUDDING COMPOSITIONS

Margaret H. Kennedy, New York, and Mary P. Castagna, Brooklyn, N. Y., assignors to Standard Brands Incorporated, New York, N. Y., a corporation of Delaware No Drawing. Application July 18, 1950, Serial No. 174,576

6 Claims. (Cl. 99—139)

This invention relates to starch pudding compositions in the form of a dry powder from which puddings of improved quality can be prepared by simply adding relatively cold water or milk.

Pudding compositions of this type have been prepared from dry pregelatinized starch and sugar but they have a raw starchy flavor, are heavy and pasty in texture, sticky in consistency and do not have satisfactory gelling or setting qualities. We have found that the flavor, texture and consistency characteristics can be greatly improved with the use at the same time of substantially less starch by including in such compositions a small amount of tetra-alkali metal pyrophosphate, such as tetrasodium pyrophosphate or tetrapotassium pyrophosphate and an edible water-soluble calcium salt, for instance calcium acetate, calcium chloride, calcium propionate, calcium saccharate and calcium tartrate. These compounds may be used in varying proportions but we have found that a mixture of about 2 to 3 grams of tetrasodium pyrophosphate and 1 to 2 grams of ralcium acetate to 20 grams of dry pregelatinized starch give the best flavor, texture and consistency.

The following table illustrates vanilla and chocolate flavored compositions made in accordance with the invention and amounts which may be added to one pint of milk to produce a pudding dessert:

|  | Vanilla | Chocolate |
|---|---|---|
|  | Grams | Grams |
| Cane Sugar | 82.4 | 81.2 |
| Precooked Starch | 20.0 | 22.0 |
| Cocoa |  | 16.0 |
| Vanilla Flavor | 2.0 | 2.0 |
| Salt | 2.4 | 2.4 |
| Vanilla Color | 2.6 |  |
| Tetrasodium pyrophosphate | 2.8 | 2.8 |
| Calcium Acetate | 1.2 | 1.2 |
| Total | 113.4 | 127.6 |

To prepare these compositions the powdered ingredients are simply mixed in dry form. Any variety of gelatinized pudding starch can be used, preferably having a granulation such that all of it will pass thru a 150 mesh screen and a large portion will pass thru a 200 mesh screen. To prepare a pudding the dry powder is mixed with cold milk and then beaten for a short time with an egg beater or electric beater. The mixture sets rather slowly, i. e. in about 5 to 10 minutes after beating, thus permitting sufficient time for pouring into molds or suitable serving dishes. The setting time will vary somewhat depending upon the temperature of the milk used, i. e. milk at room temperature will give a faster set than milk at refrigerator temperature. The product has a smooth, fluffy, chiffon-like texture and a consistency similar to that of regular cornstarch pudding.

The tetra-alkali metal pyrophosphate acts both as a protein coagulating agent and a wetting agent. It reacts with the proteins of the milk causing clotting and permits better absorption of the liquid by the precooked starch. The calcium salt provides calcium ions which aid in stabilization of the gel structure.

It is convenient to include the sugar and flavors in the composition but they may be omitted and added at the time the pudding is made up with the liquid component. If desired, dry powdered milk or casein can be included in the composition in which case only water is required to form the desired pudding.

It is to be understood that the examples are given by way of illustration only and are not to be considered limitative in any way. The listed ingredients may be replaced by equivalents and the amounts thereof may be varied within wide limits.

We claim:

1. A dry composition for producing a pudding comprising dry gelatinized pudding starch, a tetra-alkali-metal pyrophosphate and an edible water-soluble calcium salt.

2. A composition as claimed in claim 1 containing cane sugar.

3. A dry composition for producing a pudding comprising dry precooked pudding starch, tetrasodium pyrophosphate and calcium acetate.

4. A composition as claimed in claim 3 containing cane sugar.

5. A dry composition for producing a pudding comprising about 20 parts by weight of dry gelatinized pudding starch, about 2 to 3 parts by weight of tetrasodium pyrophosphate and about 1 to 2 parts by weight of calcium acetate.

6. A composition as claimed in claim 5 containing about 80 parts by weight of cane sugar.

MARGARET H. KENNEDY.
MARY P. CASTAGNA.

REFERENCES CITED

The following references are of record in the file of this patent:

UNITED STATES PATENTS

| Number | Name | Date |
|---|---|---|
| 2,341,425 | Curry | Feb. 8, 1944 |
| 2,500,179 | Hinz et al. | Mar. 14, 1950 |